United States Patent [19]

Dorai et al.

[11] Patent Number: 5,302,255

[45] Date of Patent: * Apr. 12, 1994

[54] REDUCING MOLECULAR WEIGHT DISTRIBUTION OF POLYETHER GLYCOLS BY SHORT-PATH DISTILLATION

[75] Inventors: Suriyanarayan Dorai, Lockport, N.Y.; Frank L. Rawling, Jr., Newark, Del.; James A. Schultz, Swedesboro, N.J.

[73] Assignee: E. I. Du Pont de Nemours and Company, Wilmington, Del.

[*] Notice: The portion of the term of this patent subsequent to Oct. 6, 1993 has been disclaimed.

[21] Appl. No.: 944,994

[22] Filed: Sep. 15, 1992

Related U.S. Application Data

[63] Continuation-in-part of Ser. No. 847,466, Mar. 6, 1992, abandoned.

[51] Int. Cl.⁵ .................... B01D 1/22; B01D 3/10; C07C 41/38
[52] U.S. Cl. ........................ 203/72; 159/49; 203/80; 203/89; 203/91; 568/617; 568/621
[58] Field of Search ............ 203/91, 72, 80, 89, 203/73; 568/617, 621; 202/205, 236; 159/6.2, 49

[56] References Cited

U.S. PATENT DOCUMENTS

| | | | |
|---|---|---|---|
| 4,568,775 | 2/1986 | Aoshima et al. | 568/617 |
| 4,585,592 | 4/1986 | Mueller | 568/617 |
| 4,686,273 | 8/1987 | Harris | 525/462 |
| 4,762,951 | 8/1988 | Mueller | 568/617 |
| 4,904,745 | 2/1990 | Inoue et al. | 568/616 |
| 4,933,503 | 6/1990 | Mueller | 568/617 |
| 5,053,553 | 10/1991 | Dorai | 568/621 |

FOREIGN PATENT DOCUMENTS

| | | | |
|---|---|---|---|
| 0541842 | 6/1957 | Canada | 568/617 |
| 5883028 | 2/1985 | Japan | 568/617 |
| 108424 | 5/1989 | Japan | 568/617 |
| 6042421 | 5/1989 | Japan | 568/617 |

*Primary Examiner*—Virginia Manoharan

[57] ABSTRACT

Polyether glycols, especially poly(tetramethylene ether) glycol (PTMEG) having a narrow molecular weight distribution of about 1.25 to 1.80, or dispersity of 1.05 to 1.90, are made by a process involving distilling the low molecular weight fraction in unit operations including at least one short-path distillation evaporator. Two short-path distillation evaporators, in series, are desirable if significant narrowing of the PTMEG is required. In these units, PTMEG is subjected to temperatures in the range of 270°–400° C. with the hold-up time varying between 10–200 seconds. The required vacuum to force the separation of the low molecular weight PTMEG varies between 0.001 mm and 1.0 mbar. PTMEG residue from the distillation unit is also characterized by its low water content and low concentration of oligomeric cyclic ethers.

6 Claims, 1 Drawing Sheet

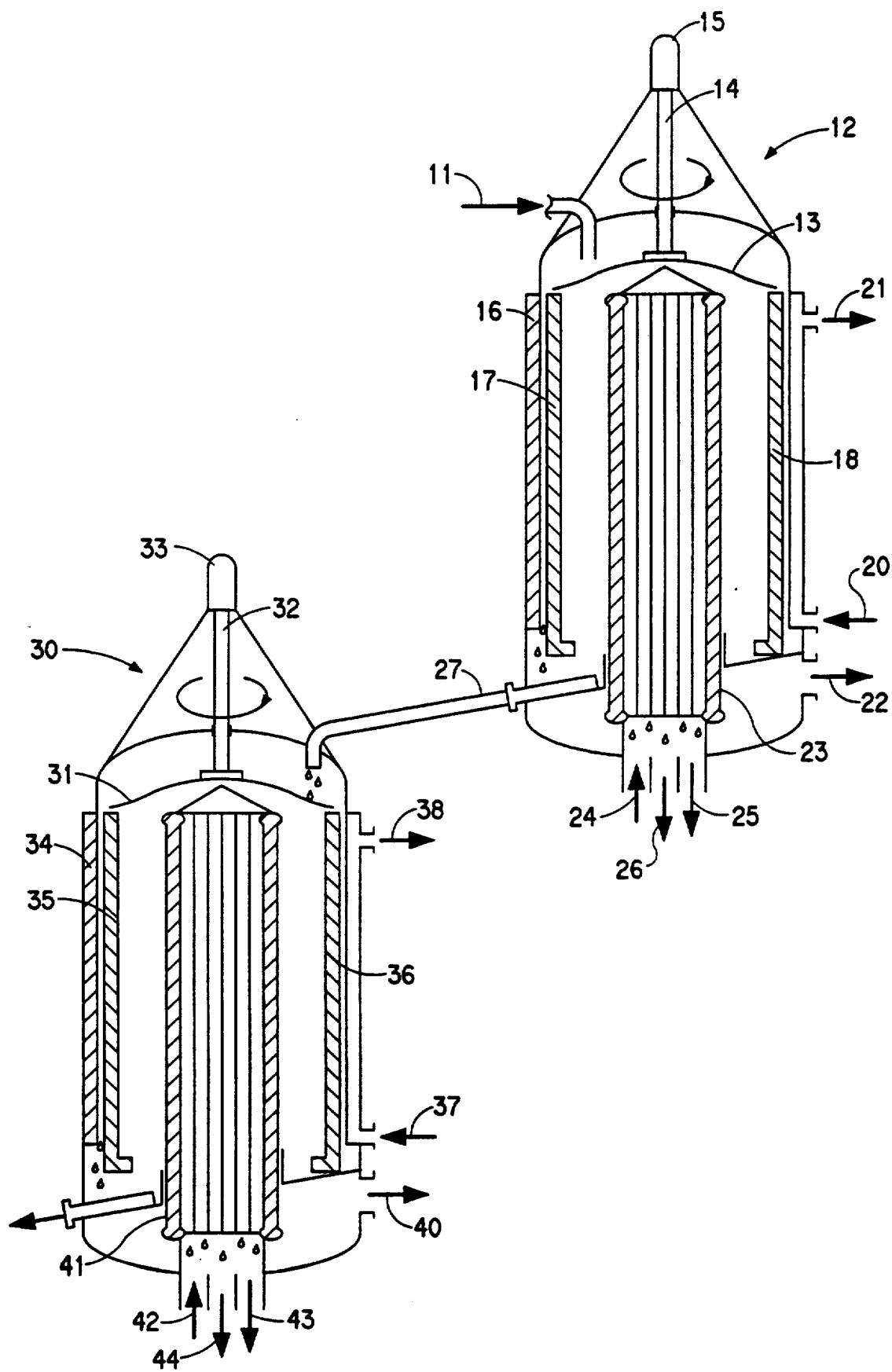

REDUCING MOLECULAR WEIGHT DISTRIBUTION OF POLYETHER GLYCOLS BY SHORT-PATH DISTILLATION

CROSS-REFERENCE TO RELATED APPLICATION

This application is a continuation-in-part of U.S. Ser. No. 07/847,466 filed Mar. 6, 1992 now abandoned.

FIELD OF THE INVENTION

The present invention relates to a process for reducing the molecular weight distribution or the polydispersity of polyether glycols, particularly poly(tetramethylene ether) glycols, by short-path distillation to separate lower molecular weight fractions at low pressure and elevated temperatures.

RELATED ART

The present invention relates to a process for preparing a narrow molecular weight distribution (NMWD) poly(tetramethylene ether) glycol (PTMEG), and, more particularly, to an improved batchwise or continuous distillation removal of low molecular weight species in a short-path distillation system.

U.S. Pat. No. 4,933,503 (Mueller to BASF) discloses a process for narrowing the molecular weight distribution of polytetrahydrofuran and of copolymers of tetrahydrofuran and alkylene oxides by distilling off the low molecular weight fractions at pressures of less than 0.3 mbar at 200° to 260° C. The residue from the distillation is mixed with a three component solvent system which can form three separate phases each containing a narrow weight distribution polymer.

Japanese Patent Application Tokukai 60-42421 (Mitsubishi) describes a process for preparing PTMEG of narrow molecular weight distribution in which a PTMEG having an average molecular weight of from 500 to 3000 is admixed with a mixed solvent comprising water and methanol. A much larger amount, i.e., greater than 1.2 times, of mixed solvent, having a water content in the range of 30-70% by weight based on total solvent, is used in proportion to PTMEG, in terms of weight ratio, to bring about separation of low molecular weight PTMEG. Separation is effected by the usual techniques for layer separation.

U.S. Pat. No. 3,478,109 describes a method for removing the lower molecular weight fraction of PTMEG from a PTMEG starting material. The PTMEG starting material is dissolved in a cycloaliphatic (cyclohexane) and/or aromatic solvent, and in aqueous methanol solution which is used as the extracting solvent for removal of the lower molecular weight fraction of PTMEG from the starting material. When the process is operated batchwise, the amount of cyclohexane present must be in excess, by weight, of the PTMEG starting material.

Japanese Patent Application No. 215111 (1983), published as Japanese Laid-Open No. 108424/1985 on Jun. 13, 1985, describes a method for fractional precipitation of PTMEG having a sharp molecular weight distribution which comprises contacting a PTMEG starting material with water in the presence of methanol and/or ethanol. The amount of water needed is up to 1.7 times the amount of methanol, or up to 3.0 times the amount of ethanol, and the precipitation of the desired PTMEG fraction can be controlled by the amount of water present.

U.S. Pat. No. 4,762,951 (Mueller to BASF) describes a process for narrowing the molecular weight distribution of polytetrahydrofuran (PTHF=PTMEG) and of copolymers of tetrahydrofuran and alkylene oxides in which the polymers are mixed with a solvent mixture consisting of an alkanol, a hydrocarbon, and water tailored to cause the mixture to separate into three phases upon standing, separating the three phases from one another, and isolating a polymer having a narrower molecular weight distribution from each of the two lower phases. The upper layer is said to contain essentially all of the oligomeric cyclic ethers.

All the above-mentioned processes use a solvent mixture to fractionate PTMEG to produce narrow molecular weight distributed PTMEG. Commercial use of solvent extraction technology is associated with high investment cost and a large number of unit operations.

U.S. Pat. No. 3,925,484 (Baker to Du Pont) claims a process for producing PTMEG having a narrow molecular weight distribution of about 1.3-1.7 by partially depolymerizing the PTMEG at a temperature from about 120°-150° C. The lower molecular weight fractions in this case are converted most rapidly to tetrahydrofuran (THF) by the partial depolymerizing process. Even though the process produces narrow molecular weight distributed PTMEG, conversion of substantial amount of polymer to lower cost THF restricts the use of this technique.

U.S. Pat. No. 4,585,592 (Mueller to BASF) describes a process for reducing the content of oligomeric cyclic ethers (OCE) in a polyoxybutylene/polyoxyalkylene glycol wherein a copolymer, obtained by copolymerization of tetrahydrofuran with a 1,2-alkylene oxide in the presence of a compound containing reactive hydrogen under the catalytic action of a bleaching earth, is subjected to distillation at an elevated temperature and under reduced pressure, the improvement which comprises: treating the copolymer, prior to said distillation, with oxygen or an oxygen-containing gas at a temperature of from 20° to 110° C.; and then carrying out the distillation under reduced pressure at a temperature above 200° C., and preferably from 210° to 250°.

The product from a tetrahydrofuran/propylene oxide copolymer after removing residual monomers and treating with air at 80° C., was charged to a rotary evaporator and heated at 220° C. and under 2 mbar pressure. Then distillate (7% by weight) consisted mainly (80%) of volatile oligomeric cyclic ethers), whose rings contained 1 to 3 oxypropyl or oxybutyl groups. Note that the PTMEG process is run with precautions to exclude air. The reason for this is that terminal hydroxyl groups are lost by oxidation to carboxylic acid groups, and the customer would find these unacceptable for their polymer use. Column 3, lines 25-35 comments on the instability of commercial polytetramethylene ether glycols above 210° C. Therefore, we believe that the stability of PTMEG at temperatures as high as 350° to 400° C., at short hold-up times, in the absence of oxygen, are not anticipated in the prior art.

U.S. Pat. No. 4,510,333 (Pruckmayr to Du Pont) claims a process for preparing poly(tetramethylene ether) glycols of narrow molecular weight distribution by bringing the tetrahydrofuran monomer and a cationic initiator together in a mole ratio such that the degree of polymerization will be at about a minimum, and at a temperature which will promote about a maximum number of tertiary oxonium ions, preferably 40° to 60° C., then quickly cooling the reaction mass to −25° to +25° C., and then adding enough tetrahydrofuran to complete the polymerization. When the desired molecular weight and molecular weight distribution have been reached, the polymerization is quenched and the poly(tetramethylene ether) glycol is isolated.

Poly(tetramethylene ether) glycols having molecular weight distributions (MWD) of 1.1 to 1.4 by this process are claimed.

SUMMARY OF THE INVENTION

The present invention is an improved process for preparing PTMEG having a molecular weight between about 400 and about 4000, and having a dispersity between about 1.20 and 1.8. The process utilizes a starting material comprising PTMEG having an average molecular weight between about 400 and about 3000, and having a dispersity between about 1.6 and 2.3.

BRIEF DESCRIPTION OF THE DRAWING

The FIGURE is a simplified process flow diagram which illustrates the major components of the process of the invention and their interconnection.

DETAILED DESCRIPTION OF THE DRAWING

The FIGURE depicts a two stage short path evaporation system. The feed PTMEG is fed at 11 to a first stage short path evaporator depicted generally at 12. The PTMEG feed drips onto product distributor plate 13 rotated by shaft 14 connected to gear motor 15. The PTMEG feed is flung by centrifugal force against the interior wall of heater jacket 16 and flows downwardly along the heater jacket 16. The interior wall of heater jacket 16 is continuously wiped with roller wipers depicted at 17 and 18. Generally three sets of rollers are used each set mounted on a shaft driven in an annular path by product distribution plate 13. The rollers serve to insure that a thin film of the desired thickness is maintained on the interior wall of heater jacket 16. Heater cycle fluid is feed at 20 to the interior of heater jacket 16 and removed at 21 to maintain the desired temperature on the interior wall of heater jacket 16. An exhaust vacuum is drawn at 22, by means not shown, to maintain the desired pressure inside the first stage of the short path evaporator 12. Internal condenser 23 is fed with cooling water at 24 and the cooling water is discharged at 25 to maintain internal condenser 23 at the desired temperature. The distillate which condenses on internal condenser 23 is removed at 26. The PTMEG residue which flows down the interior wall of heater jacket 16 is collected and discharged at 27.

The residue discharge line 27 is connected to a second short path evaporator depicted generally at 30. The PTMEG residue drips onto product distributor place 31 rotated by shaft 32 connected to gear motor 33. The residue PTMEG is flung by centrifugal force against the interior wall of heater jacket 34 and flows downwardly along the heater jacket 34. The interior wall of heater jacket 34 is continuously wiped with roller wipers depicted at 35 and 36. Again three sets of rollers are generally used with each shaft driven in an annular path by product distribution plate 31. Again the rollers serve to insure that a thin film of the desired thickness is maintained on the interior wall of heater jacket 34. Heater cycle fluid is fed at 37 to the interior of heater jacket 34 and removed at 38 to maintain the desired temperature on the interior wall of heater jacket 34. An exhaust vacuum is drawn at 40, by means not shown, to maintain the desired pressure inside the second stage of the short path evaporator 30. Internal condenser 41 is fed with cooling water at 42 and the cooling water is discharged at 43 to maintain internal condenser 41 at the desired temperature. The distillate which condenses on internal condenser 41 is removed at 44. The PTMEG residue (Product) which flows down the interior wall of heater jacket 34 is collected and discharged at 45.

The type of short path distillation apparatus depicted in the drawings enables the use of very low pressures which are essential to the success of the process of the present invention. In a single stage short path distillation apparatus evaporative pressures of 0.001 to 1.0 mbar were used. In the preferred two stage system using two short path distillation apparatus connected in series evaporative pressures in the final short path distillation apparatus is preferably in the range of 0.001 to 0.01 mbar which provides a narrow number average weight distribution corresponding to a dispersity in the range of 1.2 to 1.8 and preferably 1.25 to 1.40. Generally the temperatures used in the short path distillation apparatus will be from 270° to 400° C. with 275° to 350° C. being the preferred range.

DETAILED DESCRIPTION OF THE INVENTION

Certain terms, which are typical molecular weight distribution parameters and whose meanings are set out below, are used herein to describe the invention:

Number Average Molecular Weight (Mn)

$$Mn = \frac{\text{Sum of } (Wi) \text{ for All } i \text{ Values}}{\text{Sum of } (Wi/Mi)} \quad (1)$$

where:
Wi is the weight of the "i" the polymer species/oligomer, and
Mi is the molecular weight of the "i" the polymer species/oligomer.
Mn is determined by end group analysis by titration.
Weight Average Molecular Weight (Mw)

$$Mw = \frac{\text{Sum of } (Wi)(Mi) \text{ for All } i \text{ Values}}{\text{Sum of } (Wi) \text{ for All } i \text{ Values}}$$

Mw is determined by gel permeation Chromatography or liquid chromatography.

Dispersity/Polydispersity (Mw/Mn)

Dispersity or polydispersity, used herein interchangeably, is a universally accepted measure of molecular weight distribution, or MWD. The lower the value of dispersity, the narrower is the molecular weight distribution for the PTMEG sample under consideration.

Molecular Weight Ratio (MWR)

Molecular weight ratio (MWR) is another measure of broadness of molecular weight distribution and is related to the melt viscosity of the polymer as follows:

$$MWR = \frac{(1160)(n)(0.493)}{Mn} \quad (2)$$

where:
n is melt viscosity in poise, and Mn is number average molecular weight as defined in equation (1), and is determined by end group analysis by titration.

Typically, the molecular weight distribution parameters of the polymer produced in the polymerization step are:

Dispersity = 2.0–2.1
MWR = 2.3–2.6

The molecular weight distribution of commercially salable regular PTMEG, however, are narrower than the polymer produced in the reactor:
Dispersity = 1.5–1.8
MWR = 1.95–2.05

The molecular weight distribution parameters of narrow molecular weight distributed (NMWD) PTMEG, which is desired for certain specific applications, are extremely stringent:
Dispersity = 1.25–1.40
MWR = 1.5–1.7

STEPS OF THE PROCESS

The process for narrowing the dispersity begins with a PTMEG product of broad molecular weight distribution resulting from the typical commercial manufacturing process described above using fluorosulfonic acid as polymerization catalyst. The process can also be used to narrow the MWD of PTMEG from any other similar process including blends of different molecular weight PTMEG lots.

Terathane (R) 1,000 is a commercial PTMEG having a nominal number average molecular weight of 1,000 and a Mw/Mn of 1.75. Terathane (R) 2,000 is a commercial PTMEG having a nominal number average molecular weight of 2,000 and a Mw/Mn of 1.85. PTMEG 250 is a commercially available PTMEG having a nominal number average molecular weight of 250 and a low Mw/Mn.

The series of short-path distillation of PTMEG samples was carried out using the apparatus shown in the Drawing, a pilot unit designed to produce higher feed rates. An excellent description of "Molecular and Short-path Distillation" by Klaus J. Erdweg appeared in Chemistry and Industry (London), May 2, 1983, pages 342–345. In these units, PTMEG feed rate is usually controlled at 8–10 Kg/hour. A sketch of the pilot unit used is displayed in the Drawing. The system used was a two-stage stainless steel (316) unit and the evaporator surface was 0.1 square meter/evaporator. The PTMEG feed was pumped into the first short-path evaporator where it was distributed into a thin film by means of a highly efficient self-cleaning roller wiper system available from UIC Inc., Joliet, Ill. The roller wiper system consisted of a wiper basket with an upper holding plate and stabilization rings, which were interconnected by the holders of the guide rods for the poly(tetrafluoroethylene) (PTFE) rollers. The PTMEG feed was flung by centrifugal force from the upper rotating distribution plate against the upper part of the evaporator surface. Follower rollers, made of glass-fiber-reinforced PTFE immediately spread the product to a film of uniform thickness. Rollers, supported on the guide rods with an extremely large clearance, were also pressed into the product film by centrifugal force. No product residue remained inside the rollers. Even small amounts of material were readily pressed out of the roller's interior by centrifugal force. Hence there were no product residues to cause thermal decomposition. The evaporated low molecular weight PTMEG condensed on the surface of an internal condenser without any noticeable decomposition and was collected in a condensate flask. An external cooling trap condensed any residual vapor that may have been present. Finally, any non-condensable constituents were aspirated by the three vacuum pumps—a vane pump, a Roots blower and a diffusion pump. Any one or all three pumps were used depending upon the vacuum desired. The high molecular weight species next flowed via a pressure barrier into the second short-path evaporator, and was there separated into distillate II, which was collected in a distillate receiver and residue. Results are reported in Table 1.

TABLE 1

Pilot Unit Distillation of PTMEG Samples
The feed PTMEG for EXAMPLES 1 through 4 was commercial PTMEG (Mn = 982, MWR = 2.06).
The vacuum pump set consisted of WA-150/D16A for stage 1, and JET 170 Diffusion Pump/D16A for stage 2. Flanges of the equipment are nitrogen-shrouded to prevent product degradation by exposure to oxygen. Extremely short hold-up times in the short path distillation unit has also prevented product from degrading. As soon as the product leaves the short-path distillation unit, it is cooled to 70°–80° C.

| | EXAMPLE 1 | EXAMPLE 2 | EXAMPLE 3 | EXAMPLE 4 |
|---|---|---|---|---|
| Feed Heat. | 51° C. | 52° C. | 53° C. | 54° C. |
| Feed Temp. | 50° C. | 50° C. | 52° C. | 53° C. |
| Evap. 1 Temp. In | 304° C. | 304° C. | 305° C. | 291° C. |
| Evap. 1 Temp. Out | 300° C. | 302° C. | 302° C. | 289° C. |
| Siphon Lock | 101° C. | 15° C. | 101° C. | 98° C. |
| Evap. 2 Temp. In | 350° C. | 315° C. | 305° C. | 290° C. |
| Evap. 2 Temp. Out | 348° C. | 314° C. | 303° C. | 288° C. |
| Condenser 1 | 48° C. | 46° C. | 48° C. | 46° C. |
| Condenser 2 | 47° C. | 46° C. | 47° C. | 45° C. |
| Residue Temp. | 73° C. | 75° C. | 71° C. | 71° C. |
| Trap 1 Temp. | −38° C. | −36° C. | −37° C. | −36° C. |
| Trap 2 Temp. | −38° C. | −37° C. | −37° C. | −37° C. |
| Pressure 1 | 0.04 mbar | 0.04 | 0.03 | 0.03 |
| Pressure 2 | 0.008 | 0.004 | 0.005 | 0.005 |
| Distillate 1 | 22.59% | 24.57% | 17.47% | 22.93% |
| Distillate 2 | 14.02% | 7.22% | 34.52% | 4.48% |
| Residue | 63.39% | 68.21% | 48.00% | 72.60% |
| Total Mass | 1481.7 g | 2153.6 g | 3054.1 g | 3424.0 g |
| Cut Time | 18 min. | 37 min. | 40 min. | 67 min. |
| Feed Rate | 4.9 kg/hr. | 3.5 kg/hr | 4.6 kg/hr. | 3.1 kg/hr |
| PTMEG FEED Mn | 982 | 982 | 982 | 982 |
| PTMEG FEED MWR | 2.06 | 2.06 | 2.06 | 2.06 |
| First Stage Distillate: | | | | |
| Mn | 540 | 445 | 452 | |
| MWR | 1.97 | | | |
| Dispersity | | 1.16 | 1.16 | |
| Second Stage Distillate: | | | | |
| Mn | | 635 | 637 | 724 |
| Dispersity | | 1.18 | 1.16 | 1.10 |
| Residue: | | | | |
| Mn | 1760 | 1548 | 1530 | 1528 |
| MWR | | 1.59 | 1.59 | 1.56 |
| Dispersity | 1.32 | 1.30 | 1.30 | 1.30 |
| Water, ppm | <20 | | | |
| OCE, ppm | | | | |

The content of the lower molecular weight linear and cyclic oligomers of the feed and residue of EXAMPLE 3 are shown below.

| Oligomer | Feed | EXAMPLE 3 |
|---|---|---|
| 2 | 0.25 | No GC peaks detected |
| C3 | 0.05 | " |
| 3 | 2.59 | " |
| C4 | 0.58 | " |
| 4 | 3.68 | " |
| C5 | 0.39 | " |
| 5 | 0.99 | " |

The following Short Path Distillation runs were carried out in a KD-10 unit which had an evaporator of 0.1 square meter. The feed rate was 10 lbs./hour, and the hold-up time in the short path distillation unit was 35 seconds.

|  | EXAMPLES 5-8 | EXAMPLES 9-11 | EXAMPLES 12-14 |
|---|---|---|---|
| Mn | 992 | 1314 | 1763 |
| Viscosity | 3.06 | 6.53 | 9.79 |
| MWR | 2.03 | 2.23 | 2.03 |
| Dispersity | 1.70 | 1.92 | 1.85 |
| Ash | <5 ppm | 0 | 0 |
| Calcium, Iron | 0 ppm | 0 | 0 |
| Carbonyl Ratio | 0.6 | 1.8 | 0.5 |
| Stabilizer | 0.062% | 0.04% | 0.065% |
| Fluoride | 203 ppm | 128. ppm | 83.5 ppm |
| FEED RATE | 10. lb/hr | 10. lb/hr | 10. lb/hr |
| Hold-up Time in short Path Distillation | 35. sec | 35. sec | 35. sec |

|  | EXAMPLE 5 | EXAMPLE 6 | EXAMPLE 7 | EXAMPLE 8 |
|---|---|---|---|---|
| Temperature | 275° C. | 300° C. | 325° C. | 350° C. |
| Distillate Analysis |  |  |  |  |
| Mn by GPC | 472 | 491 | 527 | 572 |
| Dispersity Weight % | 1.08 | 1.15 | 1.09 | 1.09 |
| Distilled | 18.6 | 24.2 | 30.3 | 35.0 |
| Fluoride |  |  |  | 315 ppm |
| Residue Anal. |  |  |  |  |
| Mn by GPC | 1374. | 1435. | 1525 | 1627 |
| Dispersity | 1.32 | 1.28 | 1.25 | 1.20 |
| Mw by end-group titration | 1365. | 1450. | 1580. | 1681. |
| Viscosity | 4.01 | 4.25 | 4.53 | 4.80 |
| MWR | 1.69 | 1.63 | 1.55 | 1.50 |
| Ash | <5. | <5. | <5. | <5. |
| Calcium | 0 | 0 | 0 | 0 |
| Iron | 0 | 0 | 0 | 0 |
| Fluoride |  |  |  | 95 ppm |
| Carbonyl Ratio | 1.77 | 3.16 | 7.3 | 11.8 |
| Stabilizer | 0.022% | 0.033% | 0.002% | 0.001% |

EXAMPLES 9-11

| STARTING MATERIAL |  |
|---|---|
| Mn | 1314. |
| Viscosity | 6.53 |
| MWR | 2.23 |
| Dispersity | 1.92 |
| Ash, ppm | 0 |
| Calcium, ppm | 0 |
| Iron, ppm | 0 |
| Carbonyl Ratio | 1.8 |
| Stabilizer, % | 0.04 |
| Fluoride, ppm | 128. |
| Feed Rate, lb/hr | 10. |
| Hold-up Time, sec | 35. |

|  | EXAMPLE 9 | EXAMPLE 10 | EXAMPLE 11 |
|---|---|---|---|
| Temperature | 275° C. | 300° C. | 325° C. |
| DISTILLATE |  |  |  |
| Mn by GPC | 465 | 478 | 518 |
| Dispersity | 1.06 | 1.07 | 1.09 |
| Weight % distilled | 12.1 | 15.3 | 18.7 |
| Fluoride, ppm |  |  | 313. |
| RESIDUE Anal. |  |  |  |
| MN by GPC | 1718. | 1797. | 1886. |
| Dispersity | 1.69 | 1.67 | 1.52 |
| Mn by end-group titration | 1701. | 1815. | 1901 |
| Viscosity | 6.84 | 7.10 | 7.29 |
| MWR | 1.76 | 1.68 | 1.63 |
| Ash, ppm | <5. | <5. | <5. |
| Calcium | 0 | 0 | 0 |
| Iron | 0 | 0 | 0 |
| Carbonyl Ratio | 0 | 4.5 | 0 |
| Stabilizer, % | 0.078 | 0.002 | 0.067 |

EXAMPLES 12-14

| STARTING MATERIAL |  |
|---|---|
| Mn | 1763. |
| Viscosity | 9.79 |
| MWR | 2.03 |
| Dispersity | 1.85 |
| Calcium, ppm | 0 |
| Iron, ppm | 0 |
| Stabilizer, % | 0.065 |
| Carbonyl Ratio | 0.5 |
| Fluoride, ppm | 83.5 |
| Feed Rate, lb/hr | 10. |
| Hold-up time in Short Path Distillation, sec. | 35. |

|  | EXAMPLE 12 | EXAMPLE 13 | EXAMPLE 14 |
|---|---|---|---|
| Temperature | 275° C. | 300° C. | 325° C. |
| DISTILLATE Anal. |  |  |  |
| Mn | 464 | 493 | 529 |
| Dispersity | 1.08 | 1.09 | 1.11 |
| Fluoride, ppm |  | 235 |  |
| Weight % distilled | 6.3 | 8.0 | 9.0 |
| RESIDUE Anal. |  |  |  |
| MN by GPC | 2155. | 2280. | 2306. |
| Dispersity | 1.62 | 1.57 | 1.54 |
| Mn by end-group titration | 2092. | 2237. | 2346. |
| Viscosity | 11.3 | 11.95 | 13.01 |
| MWR | 1.83 | 1.76 | 1.75 |
| Ash, ppm | <5. | <5. | <5. |
| Calcium, ppm | 0 | 0 | 0 |
| Iron, ppm | 0 | 0 | 0 |
| Carbonyl Ratio | 0.5 | 1.6 | 1.26 |
| Stabilizer, % | 0.013 | 0.007 | 0.006 |

The merits offered by commercial applications of the short-path distillation emphasize the flexibility to product different grades of poly(tetramethylene ether) glycols tailored or optimized for specific polymer end-uses. This cannot be done by existing continuous plants because of a hold-up time of 20–24 hours in the process equipment. For example the change from producing polytetramethylene ether glycol having Mn 1,000 to polytetramethylene ether glycol having Mn 1,800 in a commercial plant under steady state conditions results in a year's time several hundred thousand pounds of transition material with a molecular weight of 1200–1300 and extremely high polydispersity. The transition products cannot usually be blended with regular grades because of the adverse affect on performance in critical applications. Proper disposal of the unusable transition material is costly regardless of how the disposal is carried out. Short-path distillation equipment, however, allows fractionation of the transition material into useful or blendable material.

For example, Mn 1200 to Mn 1300 transition material by use of short-path distillation can be converted into a Mn 1000 grade distillate suitable for use and Mn 1600 residue that can be blended satisfactorily with Mn 1800 residue. Or the same Mn 1200–1300 transition material can be converted to a Mn 650 grade distillate for sale and a Mn 1700 residue for blending with a Mn 1800.

PTMEG is very hygroscopic. Water in PTMEG is a source of constant concern to polyurethane manufacturers since water reacts with isocyanates in competition with the polyols thus altering the molecular weight and stoichiometry of the polyurethane. The water content of short-path distillation of PTMEG has resulted in water contents of <20 ppm (anhydrous) consistently.

We claim:

1. A separation process consisting essentially of feeding poly(tetramethylene ether) glycol having a dispersity of 1.8 to 2.3 to at least one short-path distillation apparati each of which has at least one mechanically wiped cylindrical evaporator surface, providing a film of poly(tetramethylene ether) glycol on said evaporator surface, maintaining said evaporator surface at 270° to 400° C. and a pressure of 0.001 to 1.0 millibar, condensing evaporated material on an internal condenser mounted inside said cylindrical evaporator surface and recovering unevaporated poly(tetramethylene ether) glycol having a reduced molecular weight ratio of 1.5 to 2.05 and a dispersity of 1.2 to 1.8.

2. The process of claim 1 wherein the poly(tetramethylene ether) glycol being fed to the first short-path distillation apparati has a number average molecular weight of from 400 to 4,000.

3. The process of claim 2 wherein the molecular weight ratio of the poly(tetramethylene ether) glycol being fed to the short-path distillation apparati is from 2.0 to 2.6.

4. The process of claim 3 wherein the short-path distillation apparati have two or more serially connected evaporator surfaces.

5. The process of claim 4 wherein the evaporative pressure in the final short-path distillation apparati is from 0.001 to 0.01 mbar.

6. The process of claim 5 wherein the product narrow weight distribution poly(tetramethylene ether) glycol has a dispersity of 1.25 to 1.40.

* * * * *

UNITED STATES PATENT AND TRADEMARK OFFICE
CERTIFICATE OF CORRECTION

PATENT NO. : 5,302,255

DATED : April 12, 1994

INVENTOR(S) : Dorai et al

It is certified that error appears in the above-identified patent and that said Letters Patent is hereby corrected as shown below:

On the title page, "[*] Notice: Oct. 6, 1993" should read --February 1, 2011--

Signed and Sealed this

Eleventh Day of June, 1996

Attest:

BRUCE LEHMAN

Attesting Officer

Commissioner of Patents and Trademarks